US006636237B1

(12) United States Patent
Murray et al.

(10) Patent No.: US 6,636,237 B1
(45) Date of Patent: Oct. 21, 2003

(54) METHOD FOR CREATING AND SYNCHRONIZING LINKS TO OBJECTS IN A VIDEO

(76) Inventors: James H. Murray, 855 N. Pemberton, Bloomfield Hills, MI (US) 48302; Neal Fairbanks, 34444 Grove Dr., Livonia, MI (US) 48154-2524

(*) Notice: Subject to any disclaimer, the term of this patent is extended or adjusted under 35 U.S.C. 154(b) by 491 days.

(21) Appl. No.: 09/630,002

(22) Filed: Jul. 31, 2000

(51) Int. Cl.$^7$ ............... G06F 15/00; G06T 13/00; G09G 5/00
(52) U.S. Cl. ............... 345/719; 345/475; 345/667; 345/720; 345/723; 715/500.1
(58) Field of Search ............... 345/651, 654, 345/655, 664, 665, 667, 473–475, 706, 719, 720–723, 757, 961; 715/500.1, 501.1

(56) References Cited

U.S. PATENT DOCUMENTS

| | | | | |
|---|---|---|---|---|
| 5,684,715 A | * | 11/1997 | Palmer | 348/473 |
| 5,704,050 A | * | 12/1997 | Redpath | 345/764 |
| 5,893,091 A | | 4/1999 | Hunt et al. | 707/3 |
| 5,950,172 A | | 9/1999 | Klingman | 705/26 |
| 6,002,394 A | * | 12/1999 | Schein et al. | 725/39 |
| 6,011,562 A | * | 1/2000 | Gagne et al. | 345/473 |
| 6,044,403 A | | 3/2000 | Gerszberg et al. | 709/225 |
| 6,144,375 A | * | 11/2000 | Jain et al. | 715/500.1 |
| 6,144,390 A | * | 11/2000 | Ensor | 345/473 |
| 6,144,975 A | * | 11/2000 | Harris et al. | 715/500 |
| 6,161,126 A | * | 12/2000 | Wies et al. | 709/203 |
| 6,166,744 A | * | 12/2000 | Jaszlics et al. | 345/629 |
| 6,219,045 B1 | * | 4/2001 | Leahy et al. | 345/757 |
| 6,326,963 B1 | * | 12/2001 | Meehan | 345/419 |
| 6,388,665 B1 | * | 5/2002 | Linnett et al. | 345/473 |
| 6,404,978 B1 | * | 6/2002 | Abe | 386/55 |
| 6,417,853 B1 | * | 7/2002 | Squires et al. | 345/473 |

* cited by examiner

Primary Examiner—Kristine Kincaid
Assistant Examiner—Thomas J Joseph
(74) Attorney, Agent, or Firm—Howard & Howard

(57) ABSTRACT

The subject invention provides a method of providing information to a viewer of a video through a video player (14) on a display such as a computer screen or television screen. A program allows an operator to create links between specific information and dynamic objects (10) within the changing scenes (12) of the video. The subject invention uses a program to establish and store the links. The operator can create the links manually or the program can identify features of the object (10) and then maintain the link when the dynamic object (10) changes in size or shape. The program records all of the links and compiles the information into an interface (18). The interface (18) is transparent and is positioned over the video player (14) on the screen (16). The program synchronizes the links to the video. A viewer, while watching the video, can select one of the objects (10) in the scene (12). The video either stops and the specific information linked to the object (10) is displayed in a window (20) or the video continues to play behind the window (20) displaying the information. When the viewer chooses to close the window (16), the video resumes its normal play.

14 Claims, 2 Drawing Sheets

METHOD FOR CREATING AND SYNCHRONIZING LINKS TO OBJECTS IN A VIDEO

BACKGROUND OF THE INVENTION

1. Field of the Invention

The subject invention relates to a method of providing information specific to objects on a display.

2. Description of the Prior Art

There are various methods of providing information that link specific information to a video which are well known in the prior art. An example of such a method is disclosed in the U.S. Pat. No. 6,002,394 to Schein et al. This patent describes an invention practiced under the trademark "WebTV", hereinafter referred to as interactive TV.

The interactive TV provides a television schedule and information guide, which allows interaction between a television viewer and information associated with a television program. Two-way communication is established with an on-line internet provider. The on-line internet provider is used to provide information from broadcast stations and advertisers. The on-line internet provider supplies information concerning the television program, actors, products related to the program, etc. This information is displayed in a product window. The link to the information is established between the information and the program itself. The information in only unique to the program the viewer chooses to select.

SUMMARY OF THE INVENTION AND ADVANTAGES

The subject invention includes a method of delivering information comprising the steps of accessing video media having a changing scene with dynamic objects therein and storing information specific to the dynamic objects. The method is characterized by displaying the information specific to the dynamic object within the changing scene in response to visually cueing the dynamic object.

Accordingly, the information is linked directly to the dynamic object in the changing scene. Therefore, at the same time, a plurality of dynamics objects would be accessible to a viewer. Each dynamic object would contain a link to specific information related to that object. The subject invention provides the viewer access to more information than just the generic information linked to the television program or video.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
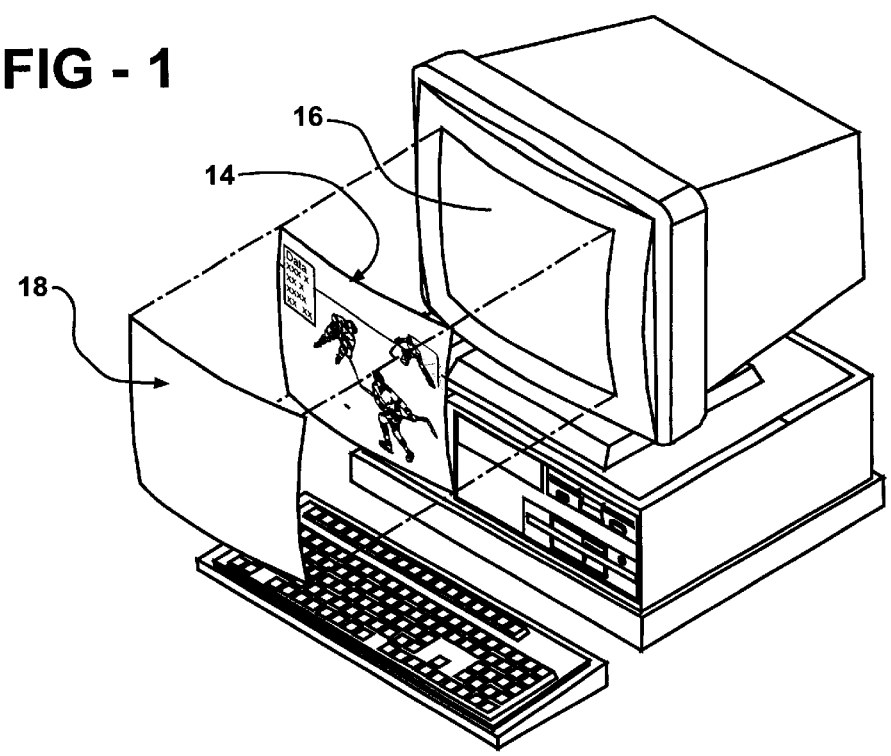
FIG. 1 is an exploded perspective of the program of the subject invention running concurrently with a video player on a computer monitor.

Referring to the Figures, wherein like numerals indicate like or corresponding parts throughout the several views, the subject invention includes the method of providing information related to dynamic objects 10 within a video. The method begins with the step of accessing, i.e., playing, video media that has a changing scene 12. This is accomplished with the use of a video player 14. The changing scene 12 includes dynamic objects 10. The method proceeds with the step of storing information related to the dynamic objects 10 within the changing scene 12.

The method is characterized by displaying the information that is specific to the dynamic objects 10 within the changing scenes 12. The method displays this information in response to visual cueing. A viewer of the video media selects a dynamic object 10 on a display 16. The information is then displayed that is specific to that dynamic object 10.

The subject invention utilizes a program to perform the steps of the method. The program is used for entering, linking and storing the information specific to the dynamic objects 10 within the scenes 12. The program as also creates an interface 18 that allows interaction between the video and the viewer. The interface 18 allows the viewer to select the dynamic object 10 within the scene 12 and retrieves the specific information linked to that object 10.

Figure 3:
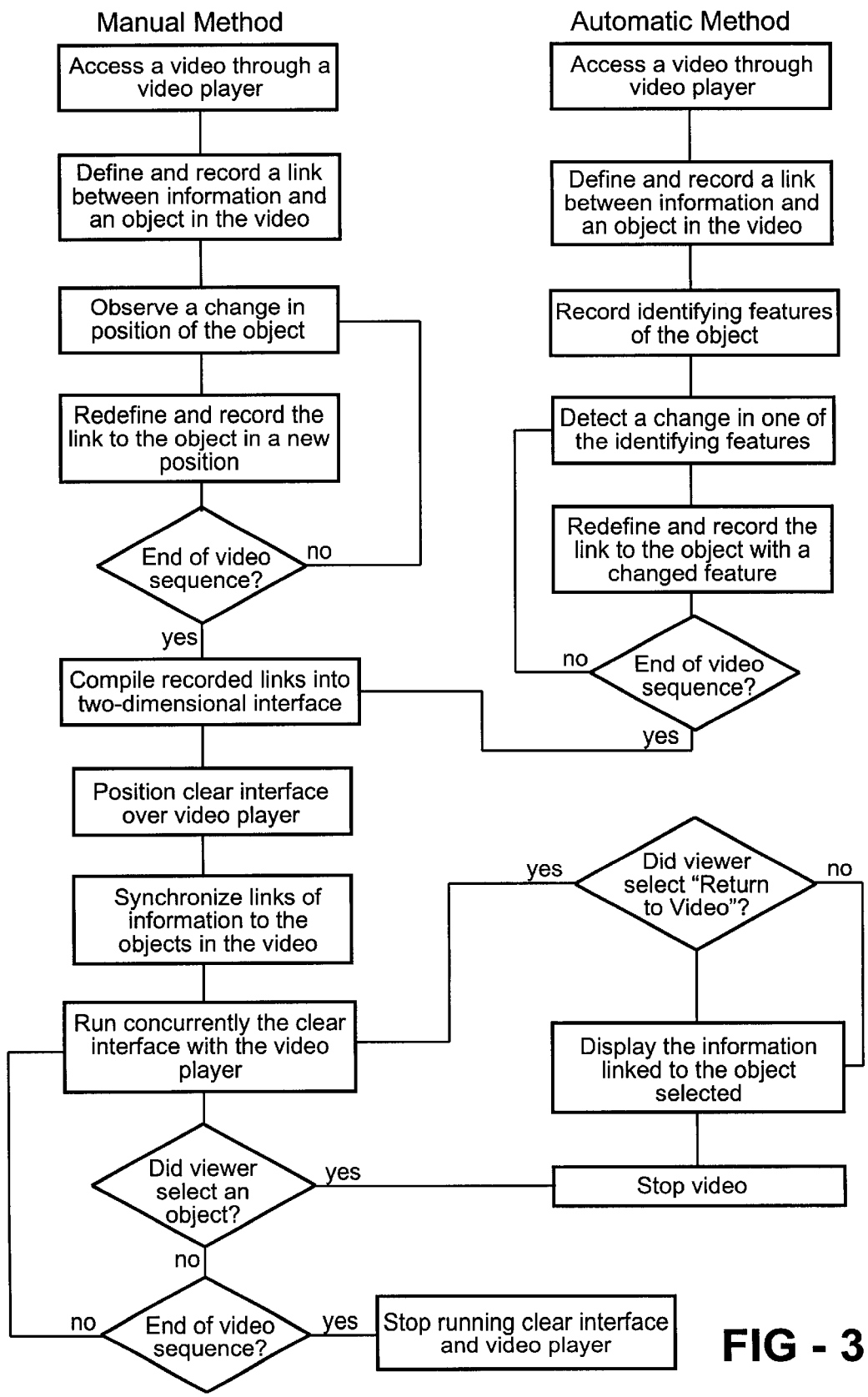
FIG. 3 is a schematic diagram of the steps of the method of the subject invention.

The method includes the steps of creating a new link. There are two techniques to create the links between the specific information and the dynamic object 10. The steps of both techniques are illustrated in a schematic outline in FIG. 3. The manual method requires complete control from an operator. The steps of the manual method begin with accessing a video through a video player 14. The operator determines which dynamic object 10 to which to link information. The operator then defines this link by selecting the object 10 in the video, i.e. defining positional information for the object. Often this step is accomplished through the use of standard computer equipment such as a mouse or keyboard. The operator uses the program and the standard computer equipment to surround the dynamic object 10 with a link. The operator then defines the positional information specific to the link. The program records the specific information and the link to the dynamic object 10 changes in size, shape or location, i.e., the positional information, the operator must redefine the link to the dynamic object 10. The program records the links of the information to the dynamic object 10. The step of redefining the link when the dynamic object 10 changes in size, shape or location is repeated until the video sequence.

In the alternative, the automatic method eliminates the need for complete control by the operator. The initial steps of the automatic method are the same as the manual method. The operator must first access the video through the use of a video player 14. Then, the operator determines which dynamic object 10 to link the information. Through the use of the program the operator defines the link and the information. The program records the link and information. The program also records several identifying features about the object 10 the operator has selected. The identifying features include features such as pixel size, location or color. The program then monitors the video to identify changes in any of the identifying features. When one of the identifying features changes, the program automatically redefines the link of specific information to the object 10. The program continues to search for changes of the identifying features and redefine the links until the end of the video sequence.

The remaining steps of the method are the same for both the manual and automatic techniques of defining the links. The next step is for the program to compile the recorded links into the interface 18. Referring to FIG. 1, the interface 18 is positioned over the video player 14 and runs concurrently. The interface 18 is clear or transparent. The video is observed by the viewer and the links to the specific information of each dynamic object 10 are still attached and available. Once the interface 18 is positioned over the video player 14, the links of information to the objects 10 are synchronized with the video. For the synchronization step, the program uses the details recorded earlier when the operator or program was defining the links. When the video player 14 plays the video the interface 18 runs concurrently providing the viewer with access to the synchronized links.

Figure 2:
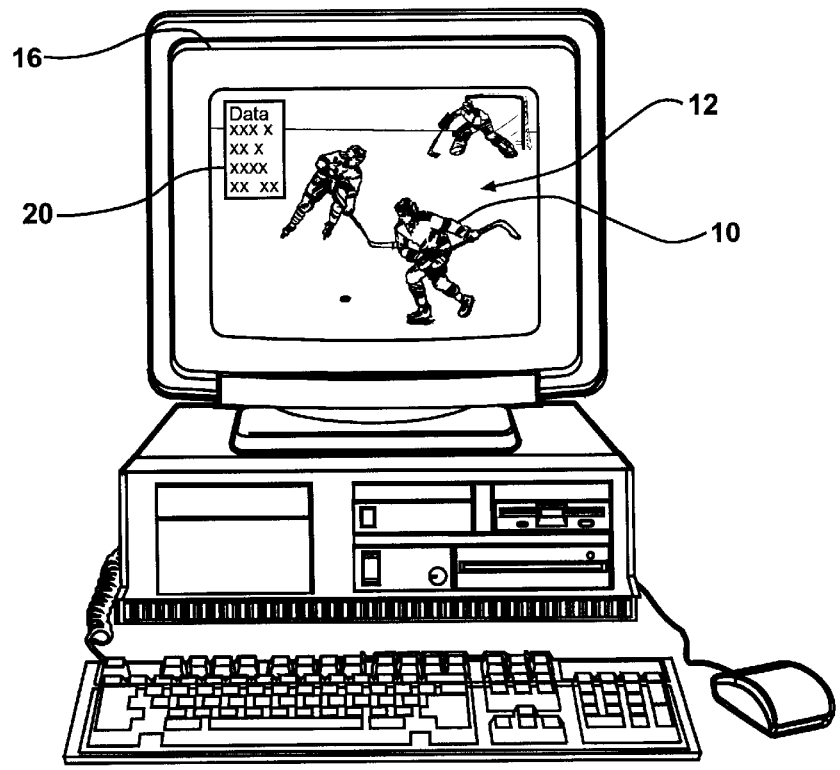
FIG. 2 is a frontal elevation of the computer screen when a viewer accesses a link between a dynamic object and information related to the dynamic object.

During play of the video, a viewer can access the specific information linked to the dynamic objects 10 in the changing scenes 12 of the video. To access the information the viewer must select the desired object 10. Again, this is commonly accomplished with the use of standard computer equipment such as a mouse or keyboard. Typically, a viewer uses the mouse to place a cursor over the dynamic object 10 in the video. When the cursor is in position, the viewer then clicks once or twice to select the object and display the linked information. The invention will either stop play of the video and display the information or continue to run the video while concurrently displaying the linked information. If the video is to stop playing, once one of the dynamic objects 10 is selected all changes and movement in the video halts. The video does not advance any further. Once the video is stopped, the specific information linked to the object 10 is displayed in a window 20 next to the dynamic object. Please refer to FIG. 2. After reviewing the information, the viewer can select a button on the screen that returns to the video. The video resumes play at the point it was originally halted. The interface 18 remains positioned over the video player 14. The video continues to play until another dynamic object 10 is selected by the viewer or until the end of the video sequence.

Alternatively, if the video is to continue playing, the window 20 is displayed containing the linked information over the continually playing video on the display. The video will continue to play behind the window. After reviewing the information, the viewer can select a button on the screen that closes the window that contains the linked information and continue to observe the video. The video continues to play until another dynamic object 10 is selected by the viewer or until the end of the video sequence Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of retrieving object information for an object present in a media stream, said method comprising the steps of:

disposing an interface over the media stream;

defining positional information for the object within the interface based upon a position and size of the object in the media stream;

storing the positional information for the object;

creating a link within the interface independently of accessing the media stream between the positional information stored for the object and the position of the object in the media stream;

displaying the link within the interface and over the object during playback of the media stream based upon the positional information for the object;

selecting the link from within the interface;

accessing object information related to the object in response to selecting the link from within the interface; and redefining the positional information within the interface in response to the position of the object within the media stream by enlarging the link for the object within the interface in response to the size of the object becoming larger in the media stream, reducing the link for the object within the interface in response to the size of the object becoming smaller in the media stream, removing the link for the object from within the interface all response to the object disappearing from the media stream, and re-creating the link for the object within the interface in response to the object reappearing in the media stream.

2. A method as set forth in claim 1 wherein the step of creating the link further includes the step of creating a plurality of links for the object in response to the object being present in a plurality of positions in the media stream.

3. A method as set forth in claim 1 wherein the step of creating the link is further defined as synchronizing the positional information for the object within the interface with the position of the object in the media stream.

4. A method as set forth in claim 3 wherein the step of synchronizing is further defined as determining a time period that the object remains in the position in the media stream and recording the time period within the interface.

5. A method as set forth in claim 4 further including the step of displaying the link within the interface for the time period to allow the link to be selected to access the object information.

6. A method as set forth in claim 1 further including the step of detecting an identifying feature of the object and isolating the identifying feature within the interface.

7. A method as set forth in claim 6 further including the step of monitoring the identifying feature in the media stream and detecting a change in the identifying feature.

8. A method as set forth in claim 7 further including the step of redefining the positional information of the object within the interface in response to detecting the change of the identifying feature.

9. A method as set forth in claim 8 wherein the step of detecting the change in the identifying feature is further defined as automatically detecting the change in the identifying feature within the interface during playback of the media stream.

10. A method as set forth in claim 9 wherein the step of re-defining the positional information in response to detecting the change is further defined as automatically re-defining the positional in formation within the interface during playback of the media stream.

11. A method as set forth in claim 1 further including the step of stopping playback of the media stream in response to selecting the link within the interface.

12. A method as set forth in claim 11 further including the step of displaying the object information in at least one of the interface, a media player, and a window separate from the interface and the media player, while the playback of the media stream is stopped.

13. A method as set forth in claim 1 further including the step of continuing playback of the media stream in response to selecting the link within the interface.

14. A method as set forth in claim 13 further including the step of displaying the object information in at least one of the interface, a media player, and a window separate form the interface and the media player, while the playback of the media stream continues.

\* \* \* \* \*